(12) United States Patent
Mier et al.

(10) Patent No.: US 8,440,319 B2
(45) Date of Patent: May 14, 2013

(54) HEAT RESISTANT POLYPROPYLENE FILM

(75) Inventors: Rodolfo Mier, Pasadena, TX (US); Mark Miller, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 844 days.

(21) Appl. No.: 11/801,536

(22) Filed: May 10, 2007

(65) Prior Publication Data

US 2008/0281048 A1    Nov. 13, 2008

(51) Int. Cl.
*C08G 64/00*   (2006.01)
*C08G 63/02*   (2006.01)

(52) U.S. Cl.
USPC ......................................................... 428/515

(58) Field of Classification Search .................. 428/500, 428/515; 526/351
See application file for complete search history.

(56) References Cited

U.S. PATENT DOCUMENTS

| | | | |
|---|---|---|---|
| 4,933,193 A * | 6/1990 | Fisher | 426/107 |
| 4,981,938 A | 1/1991 | Hanari et al. | |
| 5,134,174 A | 7/1992 | Xu et al. | |
| 6,639,038 B2 | 10/2003 | Kuramoto | |
| 2004/0122196 A1 * | 6/2004 | Pierini et al. | 526/351 |
| 2006/0147663 A1 | 7/2006 | Barre et al. | |
| 2008/0207835 A1 | 8/2008 | Vestberg et al. | |

FOREIGN PATENT DOCUMENTS

| | | | |
|---|---|---|---|
| JP | 2006327183 A | | 12/2006 |
| WO | WO 2006/074930 | * | 7/2006 |

OTHER PUBLICATIONS

Heat Proof Polypropylene Film; Plastic Industry News; Jul. 1985 pp. 100; 0032-1206; Idemitsu Petrochemical Company.

* cited by examiner

*Primary Examiner* — Terressa Boykin

(57) ABSTRACT

A heat resistant film that comprises at least one layer that comprises a high crystallinity propylene polymer having a melt flow rate of from 0.5 g/10 min. to 15 g/10 min. and a xylene solubles of less than 3.5%. The propylene polymer may have a melting point above 158° C. The heat resistant film may further comprise at least a second layer, which may be a heterophasic random copolymer. The heat resistant film may be, for example, a blown film, a cast film, or an oriented film, and may be used in such articles of manufacture as construction films, retort packaging, and laminated articles.

20 Claims, 2 Drawing Sheets

HEAT RESISTANT POLYPROPYLENE FILM

FIELD

This invention relates to polypropylene and more particularly to polypropylene that is predominantly useful for high temperature applications.

BACKGROUND

The film market demands polypropylene resins that can produce a special combination of film properties. For applications involving thermal cycles, films with good heat resistance and good mechanical properties are required. The features of polyethylene and polypropylene semi-crystalline polymers are such that they cover a wide range of properties and potential applications. The density of polyethylene is from 0.92 g/cc to 0.97 g/cc with a melting temperature between 110° C. for low density polyethylene to 135° C. for high density polyethylene. On the other hand, the density of isotactic polypropylene is 0.89 to 0.91 g/cc with a melting temperature of 163° C. The physical properties of isotactic polypropylene can be determined by its degree of tacticity (or crystallinity) and by its molecular weight distribution. Because of the relatively high melting temperature of the crystalline phase, polypropylene retains its mechanical strength up to rather high temperatures.

Achieving a heat resistant propylene polymer film for applications involving thermal cycles is desirable. Producing a heat resistant film that has the necessary tear, impact, and puncture resistance is also desirable.

SUMMARY

In one embodiment, the present invention includes a heat resistant film comprising at least one layer that comprises a high crystallinity propylene polymer having a melt flow rate of from 0.5 g/10 min. to 15 g/10 min. and a xylene solubles of less than 3.5%. The propylene polymer may have a melting point above 158° C.

In one embodiment, the present invention includes a heat resistant film that further comprises at least a second layer, which may be a heterophasic random copolymer (impact copolymer). The heterophasic random copolymer may have a melt flow rate of from 0.5 g/10 min. to 15.0 g/10 min. and a melting point of from 120° C. to 170° C.

In one embodiment, the present invention includes an article of manufacture comprising a heat resistant film.

In one embodiment, the present invention includes a blown film comprising at least one layer that comprises a high crystallinity propylene polymer having a melt flow rate of from 0.5 g/10 min. to 5 g/10 min., a xylene solubles of less than 1%, and a melting point of from 160° C. to 170° C. The blown film may further comprise a second layer that comprises a heterophasic random copolymer.

In one embodiment, the present invention includes a process of producing a heat resistant film comprising co-extruding a first polyolefin polymer having a melt flow rate of form 0.5 g/10 min. to 15 g/10 min. and a melting point of from 160° C. to 170° C. and a second polyolefin polymer have a melt flow rate of 0.5 g/10 min. to 15 g/10 min. and a melting point of from 120° C. to 170° C.

DETAILED DESCRIPTION

Introduction and Definitions

Figure 1:
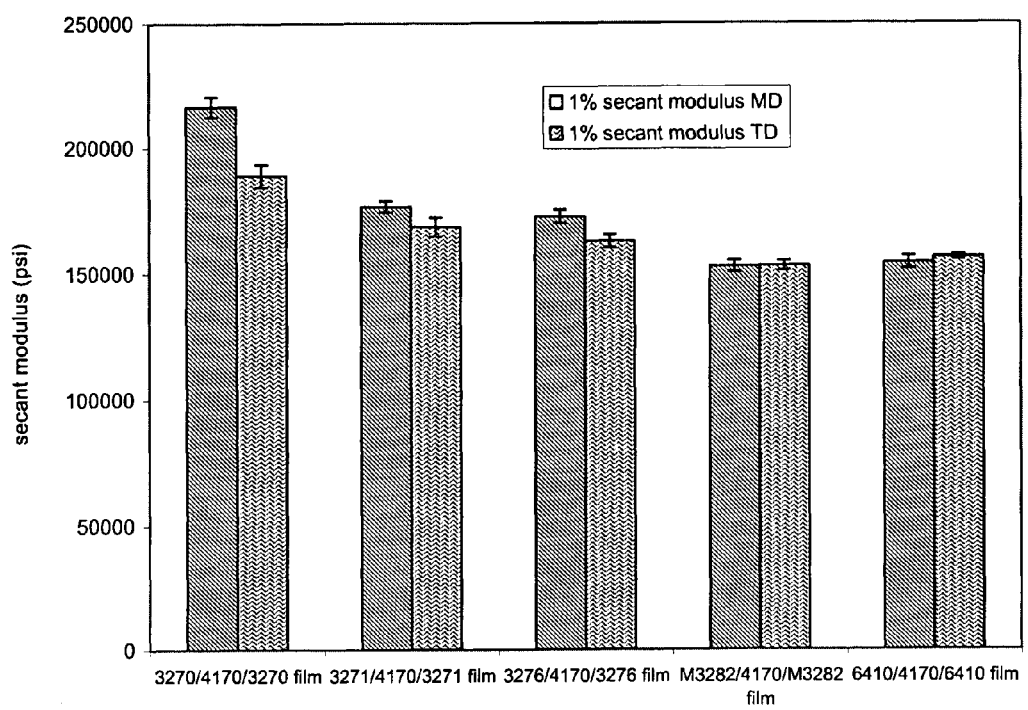
FIG. 1 illustrates the secant modulus of the films produced.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

As used herein, the term "high crystallinity" refers to a composition having a degree of crystallinity between 0.5 and 0.85 by X-ray diffraction, density, or calorimetric measurements, and, for an isotactic polypropylene, a xylene solubles of less than 3.5% or by NMR of the xylene insoluble/heptane insoluble portion of the material of greater than 94%. The degree of crystallinity, the fraction of crystalline material, may be determined by X-ray diffraction, density measurements, and differential thermal analysis (DTA).

As used herein, the term "heat resistance" or "heat resistant" refers to a materials' ability to withstand a specific thermal condition (such as heat transfer or temperature cycles) without significant physical or chemical change.

As used herein, the term "heterophasic copolymer (impact copolymer or ICP)" refers to a material having an heterophasic morphology. Specifically a polypropylene matrix where a rubber phase is dispersed in the matrix. The rubber phase is a polyolefin copolymer.

Certain polymerization processes disclosed herein involve contacting polyolefin monomers with one or more catalyst systems to form a polymer.

Catalyst Systems

The catalyst systems used herein may be characterized as supported catalyst systems or as unsupported catalyst systems, sometimes referred to as homogeneous catalysts. The catalyst systems may be metallocene catalyst systems, Ziegler-Natta catalyst systems or other catalyst systems known to one skilled in the art for the production of polyolefins, for example. A brief discussion of such catalyst systems is included below, but is in no way intended to limit the scope of the invention to such catalysts.

A. Ziegler-Natta Catalyst System

Ziegler-Natta catalyst systems are generally formed from the combination of a metal component (e.g., a catalyst precursor) with one or more additional components, such as a catalyst support, a cocatalyst and/or one or more electron donors.

A specific example of a catalyst precursor is a metal component generally represented by the formula:

where M is a transition metal, R is a halogen, an alkoxy, or a hydrocarboxyl group and x is the valence of the transition metal. For example, x may be from 1 to 4. The transition metal of the Ziegler-Natta catalyst compound, as described throughout the specification and claims, may be selected from Groups IV through VIB in one embodiment and selected from titanium, chromium, or vanadium in a more particular embodiment. R may be selected from chlorine, bromine, carbonate, ester, or an alkoxy group in one embodiment. Examples of catalyst precursors include, but are not limited to, $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$.

Those skilled in the art will recognize that a catalyst precursor is "activated" in some way before it is useful for promoting polymerization catalyst. As discussed further below, activation may be accomplished by combining the catalyst precursor with an activator, which is also referred to in some instances as a "cocatalyst." As used herein, the term "Z—N activator" refers to any compound or combination of compounds, supported or unsupported, which may activate a Z—N catalyst precursor. Embodiments of such activators include, but are not limited to, organoaluminum compounds, such as trimethyl aluminum (TMA), triethyl aluminum (TEAl) and triisobutyl aluminum (TiBAl), for example.

The Ziegler-Natta catalyst system may further include one or more electron donors to enhance stereoselectivity, such as internal electron donors and/or external electron donors. Internal electron donors may be used to reduce the atactic form of the resulting polymer, thus decreasing the amount of xylene solubles in the polymer. A polymer is "atactic" when its pendant groups are arranged in a random fashion on both sides of the chain of the polymer (low stereoselectivity). In contrast, a polymer is "isotactic" when all of its pendant groups are arranged on the same side of the chain and "syndiotactic" when its pendant groups alternate on opposite sides of the chain (both are examples of high stereoselectivity). The internal electron donors may include amines, amides, esters, ketones, nitriles, ethers and phosphines in one embodiment. The internal electron donors include, but are not limited to, diethers, succinates and thalates, such as those described in U.S. Pat. No. 5,945,366, which is incorporated by reference herein, in a more particular embodiment. The internal electron donors include dialkoxybenzenes, such as those described in U.S. Pat. No. 6,399,837, which is incorporated by reference herein, in another embodiment.

External electron donors may be used to further control the amount of atactic polymer produced. The external electron donors may include monofunctional or polyfunctional carboxylic acids, carboxylic anhydrides, carboxylic esters, ketones, ethers, alcohols, lactones, organophosphorus compounds and/or organosilicon compounds. In one embodiment, the external donor may include diphenyldimethoxysilane (DPMS), cyclohexymethyldimethoxysilane (CDMS), diisopropyldimethoxysilane and/or dicyclopentyldimethoxysilane (CPDS). The external donor may be the same or different from the internal electron donor used.

The components of the Ziegler-Natta catalyst system (e.g., catalyst precursor, activator and/or electron donors) may or may not be associated with a support, either in combination with each other or separate from one another. Typical support materials may include a magnesium dihalide, such as magnesium dichloride or magnesium dibromide, for example.

Ziegler-Natta catalyst systems and processes for forming such catalyst systems are described in at least U.S. Pat. No. 4,298,718, U.S. Pat. No. 4,544,717 and U.S. Pat. No. 4,767,735, which are incorporated by reference herein.

B. Metallocene Catalyst System

Metallocene catalysts may be characterized generally as coordination compounds incorporating one or more cyclopentadienyl (Cp) groups (which may be substituted or unsubstituted, each substitution being the same or different) coordinated with a transition metal through π bonding.

The Cp substituent groups may be linear, branched or cyclic hydrocarbyl radicals. The cyclic hydrocarbyl radicals may further form other contiguous ring structures, including, for example indenyl, azulenyl and fluorenyl groups. These additional ring structures may also be substituted or unsubstituted by hydrocarbyl radicals, such as $C_1$ to $C_{20}$ hydrocarbyl radicals.

A specific example of a metallocene catalyst is a bulky ligand metallocene compound generally represented by the formula:

where L is a bulky ligand, A is a leaving group, M is a transition metal and m and n are such that the total ligand valency corresponds to the transition metal valency. For example m may be from 1 to 3 and n may be from 1 to 3.

The metal atom "M" of the metallocene catalyst compound, as described throughout the specification and claims, may be selected from Groups 3 through 12 atoms and lanthanide Group atoms in one embodiment, selected from Groups 3 through 10 atoms in a more particular embodiment, selected from Sc, Ti, Zr, Hf, V, Nb, Ta, Mn, Re, Fe, Ru, Os, Co, Rh, Ir, and Ni in yet a more particular embodiment, selected from Groups 4, 5 and 6 atoms in yet a more particular embodiment, Ti, Zr, Hf atoms in yet a more particular embodiment and Zr in yet a more particular embodiment. The oxidation state of the metal atom "M" may range from 0 to +7 in one embodiment, in a more particular embodiment, is +1, +2, +3, +4 or +5 and in yet a more particular embodiment is +2, +3 or +4. The groups bound the metal atom "M" are such that the compounds described below in the formulas and structures are electrically neutral, unless otherwise indicated.

The bulky ligand generally includes a cyclopentadienyl group (Cp) or a derivative thereof. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

Cp typically includes fused ring(s) or ring systems. The ring(s) or ring system(s) typically include atoms selected from group 13 to 16 atoms, for example, carbon, nitrogen, oxygen, silicon, sulfur, phosphorous, germanium, boron, aluminum and combinations thereof, wherein carbon makes up at least 50% of the ring members. Non-limiting examples include 2-methyl, 4phenyl indenyl; cyclopentadienyl; cyclopentaphenanthreneyl; indenyl; benzindenyl; fluorenyl; tetrahydroindenyl; octahydrofluorenyl; cyclooctatetraenyl; cyclopentacyclododecene; phenanthrindenyl; 3,4-benzofluorenyl; 9-phenylfluorenyl; 8-H-cyclopent[a]acenaphthylenyl; 7-H-dibenzofluorenyl; indeno[1,2-9]anthrene; thiophenoindenyl; thiophenofluorenyl; hydrogenated versions thereof (e.g., 4,5,6,7-tetrahydroindenyl or $H_4Ind$); substituted versions thereof and heterocyclic versions thereof.

Cp substituent groups may include hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos and combinations thereof. More particular non-limiting examples of alkyl substituents include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl and the like. Other possible radicals include substituted alkyls and aryls such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like, halocarbyl-substituted organometalloid radicals including tris(trifluoromethyl)silyl, methylbis(difluoromethyl)silyl, bromomethyldimethylgermyl and the like, disubstituted boron radicals including dimethylboron for example, disubstituted Group 15 radicals including dimethylamine, dimethylphosphine, diphenylamine, methylphenylphosphine and Group 16 radicals including methoxy, ethoxy, propoxy, phenoxy, methylsulfide and ethylsulfide. Other substituents R include olefins, such as but not limited to, olefinically unsaturated substituents including vinyl-terminated ligands, for example 3-butenyl, 2-propenyl, 5-hexenyl and the like. In one embodiment, at least two R groups, two adjacent R groups in one embodiment, are joined to form a ring structure having from 3 to 30 atoms selected from carbon, nitrogen, oxygen, phosphorous, silicon, germanium, aluminum, boron and combinations thereof. Also, a substituent group R group such as 1-butanyl, may form a bonding association to the element M.

Each anionic leaving group is independently selected and may include any leaving group, such as halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, $C_1$ to $C_{12}$ heteroatom-containing hydrocarbons and substituted derivatives thereof, hydride, halogen ions, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls and $C_7$ to $C_{18}$ fluoroalkylaryls in yet a more particular embodiment, hydride, chloride, fluoride, methyl, phenyl, phenoxy, benzoxy, tosyl, fluoromethyls and fluorophenyls in yet a more particular embodiment, $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls, $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment, chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls and halogenated $C_7$ to $C_{18}$ alkylaryls in yet a more particular embodiment, fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment and fluoride in yet a more particular embodiment.

Other non-limiting examples of leaving groups include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides, halogen ions and combinations thereof. Other examples of leaving groups include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one embodiment, two or more leaving groups form a part of a fused ring or ring system.

L and A may be bridged to one another. A bridged metallocene, for example may, be described by the general formula:

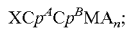

wherein X is a structural bridge, $Cp^A$ and $Cp^B$ each denote a cyclopentadienyl group, each being the same or different and which may be either substituted or unsubstituted, M is a transition metal and A is an alkyl, hydrocarbyl or halogen group and n is an integer between 0 and 4, and either 1 or 2 in a particular embodiment.

Non-limiting examples of bridging groups (X) include divalent hydrocarbon groups containing at least one Group 13 to 16 atom, such as but not limited to, at least one of a carbon, oxygen, nitrogen, silicon, aluminum, boron, germanium, tin and combinations thereof; wherein the heteroatom may also be $C_1$ to $C_{12}$ alkyl or aryl substituted to satisfy neutral valency. The bridging group may also contain substituent groups as defined above including halogen radicals and iron. More particular non-limiting examples of bridging groups are represented by $C_1$ to $C_6$ alkylenes, substituted $C_1$ to $C_6$ alkylenes, oxygen, sulfur, $R_2C=$, $R_2Si=$, $-Si(R)_2Si(R_2)-$ and $R_2Ge=$, $RP=$ (wherein "=" represents two chemical bonds), where R is independently selected from the group hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms and halogen radicals and wherein two or more Rs may be joined to form a ring or ring system. In one embodiment, the bridged metallocene catalyst component has two or more bridging groups (X).

As used herein, the term "metallocene activator" is defined to be any compound or combination of compounds, supported or unsupported, which may activate a single-site catalyst compound (e.g., metallocenes, Group 15 containing catalysts, etc.) Typically, this involves the abstraction of at least one leaving group (A group in the formulas/structures above, for example) from the metal center of the catalyst component. The catalyst components of the present invention are thus activated towards olefin polymerization using such activators. Embodiments of such activators include Lewis acids such as cyclic or oligomeric polyhydrocarbylaluminum oxides and so called non-coordinating ionic activators ("NCA"), alternately, "ionizing activators" or "stoichiometric activators", or any other compound that may convert a neutral metallocene catalyst component to a metallocene cation that is active with respect to olefin polymerization.

More particularly, it is within the scope of this invention to use Lewis acids such as alumoxane (e.g., "MAO"), modified alumoxane (e.g., "TIBAO") and alkylaluminum compounds as activators, to activate desirable metallocenes described herein. MAO and other aluminum-based activators are well known in the art. Non-limiting examples of aluminum alkyl compounds which may be utilized as activators for the catalysts described herein include trimethylaluminum, triethylaluminum, triisobutylaluminum, tri-n-hexylaluminum, tri-n-octylaluminum and the like.

Ionizing activators are well known in the art and are described by, for example, Eugene You-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391-1434

(2000). Examples of neutral ionizing activators include Group 13 tri-substituted compounds, in particular, tri-substituted boron, tellurium, aluminum, gallium and indium compounds and mixtures thereof (e.g., tri(n-butyl)ammonium tetrakis(pentafluorophenyl)boron and/or trisperfluorophenyl boron metalloid precursors). The three substituent groups are each independently selected from alkyls, alkenyls, halogen, substituted alkyls, aryls, arylhalides, alkoxy and halides. In one embodiment, the three groups are independently selected from the group of halogen, mono or multicyclic (including halosubstituted) aryls, alkyls, alkenyl compounds and mixtures thereof. In another embodiment, the three groups are selected from the group alkenyl groups having 1 to 20 carbon atoms, alkyl groups having 1 to 20 carbon atoms, alkoxy groups having 1 to 20 carbon atoms, aryl groups having 3 to 20 carbon atoms (including substituted aryls) and combinations thereof. In yet another embodiment, the three groups are selected from the group alkyls having 1 to 4 carbon groups, phenyl, naphthyl and mixtures thereof. In yet another embodiment, the three groups are selected from the group highly halogenated alkyls having 1 to 4 carbon groups, highly halogenated phenyls, highly halogenated naphthyls and mixtures thereof. By "highly halogenated", it is meant that at least 50% of the hydrogens are replaced by a halogen group selected from fluorine, chlorine and bromine. In yet another embodiment, the neutral stoichiometric activator is a tri-substituted Group 13 compound comprising highly fluorided aryl groups, the groups being highly fluorided phenyl and highly fluorided naphthyl groups.

The activators may or may not be associated with or bound to a support, either in association with the catalyst component (e.g., metallocene) or separate from the catalyst component, such as described by Gregory G. Hlatky, *Heterogeneous Single-Site Catalysts for Olefin Polymerization* 100(4) CHEMICAL REVIEWS 1347-1374 (2000).

Metallocene Catalysts may be supported or unsupported. Typical support materials may include talc, inorganic oxides, clays and clay minerals, ion-exchanged layered compounds, diatomaceous earth compounds, zeolites or a resinous support material, such as a polyolefin.

Specific inorganic oxides include, but are not limited to, silica, alumina, magnesia, titania and zirconia, for example. The inorganic oxides used as support materials may have an average particle size of from 30 microns to 600 microns or from 30 microns to 100 microns, a surface area of from 50 $m^2/g$ to 1,000 $m^2/g$ or from 100 $m^2/g$ to 400 $m^2/g$ and a pore volume of from 0.5 cc/g to 3.5 cc/g or from 0.5 cc/g to 2 cc/g. Desirable methods for supporting metallocene ionic catalysts are described in U.S. Pat. No. 5,643,847; Ser. Nos. 09/184,358 and 09/184,389, which are incorporated by reference herein.

Polymerization Processes

As indicated elsewhere herein, catalyst systems are used to make polyolefin compositions. Once the catalyst system is prepared, as described above and/or as known to one skilled in the art, a variety of processes can be carried out using that composition. Among the varying approaches that can be used include procedures set forth in U.S. Pat. No. 5,525,678, incorporated by reference herein. The equipment, process conditions, reactants, additives and other materials will of course vary in a given process, depending on the desired composition and properties of the polymer being formed. For example, the processes of U.S. Pat. No. 6,420,580, U.S. Pat. No. 6,380,328, U.S. Pat. No. 6,359,072, U.S. Pat. No. 6,346,586, U.S. Pat. No. 6,340,730, U.S. Pat. No. 6,339,134, U.S. Pat. No. 6,300,436, U.S. Pat. No. 6,274,684, U.S. Pat. No. 6,271,323, U.S. Pat. No. 6,248,845, U.S. Pat. No. 6,245,868, U.S. Pat. No. 6,245,705, U.S. Pat. No. 6,242,545, U.S. Pat. No. 6,211,105, U.S. Pat. No. 6,207,606, U.S. Pat. No. 6,180,735 and U.S. Pat. No. 6,147,173 may be used and are incorporated by reference herein.

The catalyst systems described above can be used in a variety of polymerization processes, over a wide range of temperatures and pressures. The temperatures may be in the range of from about −60° C. to about 280° C., or from about 50° C. to about 200° C. and the pressures employed may be in the range of from 1 atmosphere to about 500 atmospheres or higher.

Polymerization processes may include solution, gas phase, slurry phase, high pressure processes or a combination thereof.

In certain embodiments, the process of the invention is directed toward a solution, high pressure, slurry or gas phase polymerization process of one or more olefin monomers having from 2 to 30 carbon atoms, or from 2 to 12 carbon atoms or from 2 to 8 carbon atoms, such as ethylene, propylene, butane, pentene, methylpentene, hexane, octane and decane. Other monomers include ethylenically unsaturated monomers, diolefins having from 4 to 18 carbon atoms, conjugated or nonconjugated dienes, polyenes, vinyl monomers and cyclic olefins. Non-limiting monomers may include norbornene, nobornadiene, isobutylene, isoprene, vinylbenzocyclobutane, sytrnes, alkyl substituted styrene, ethylidene norbornene, dicyclopentadiene, and cyclopentene. In one embodiment, a copolymer is produced, such as propylene/ethylene, or a terpolymer is produced. Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process generally employs a continuous cycle, wherein a cycling gas stream (otherwise known as a recycle stream or fluidizing medium) is heated in a reactor by heat of polymerization. The heat is removed from the recycle stream in another part of the cycle by a cooling system external to the reactor. The gaseous stream containing one or more monomers may be continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. No. 4,543,399, U.S. Pat. No. 4,588,790, U.S. Pat. No. 5,028,670, U.S. Pat. No. 5,317,036, U.S. Pat. No. 5,352,749, U.S. Pat. No. 5,405,922, U.S. Pat. No. 5,436,304, U.S. Pat. No. 5,456,471, U.S. Pat. No. 5,462,999, U.S. Pat. No. 5,616,661 and U.S. Pat. No. 5,668,228, which are incorporated by reference herein.)

The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C. Other gas phase processes contemplated by the process includes those described in U.S. Pat. No. 5,627,242, U.S. Pat. No. 5,665,818 and U.S. Pat. No. 5,677,375, which are incorporated by reference herein.

Slurry processes generally include forming a suspension of solid, particulate polymer in a liquid polymerization medium, to which monomers and optionally hydrogen, along with catalyst, are added. The suspension (which may include diluents) can be intermittently or continuously removed from the reactor where the volatile components can be separated from the polymer and recycled, optionally after a distillation, to the reactor. The liquefied diluent employed in the polymerization medium is typically an alkane having from 3 to 7 carbon atoms, such as a branched alkane. The medium employed is generally liquid under the conditions of polymerization and relatively inert. Such as hexane or isobutene.

A slurry process or a bulk process (e.g., a process without a diluent) may be carried out continuously in one or more loop reactors. The catalyst, as a slurry or as a dry free flowing powder, can be injected regularly to the reactor loop, which can itself be filled with circulating slurry of growing polymer particles in a diluent. Hydrogen, optionally, may be added as a molecular weight control. The reactor may be maintained at a pressure of from about 27 bar to about 45 bar and a temperature of from about 38° C. to about 121° C., for example. Reaction heat can be removed through the loop wall since much of the reactor is in the form of a double-jacketed pipe. The slurry may exit the reactor at regular intervals or continuously to a heated low pressure flash vessel, rotary dryer and a nitrogen purge column in sequence form removal of the diluent and all unreacted monomer and comonomers. The resulting hydrocarbon free powder can then be compounded for use in various applications. Alternatively, other types of slurry polymerization processes can be used, such stirred reactors is series, parallel or combinations thereof.

Polymer Product

The polymers produced by the processes described herein can be used in a wide variety of products and end-use applications. The polymers may include polypropylene and polypropylene copolymers.

In certain embodiments, propylene based polymers can be produced using the processes described herein. These polymers include atactic polypropylene, isotactic polypropylene, semi-isotactic and syndiotactic polypropylene. Other propylene polymers include propylene block or impact copolymers.

Such propylene polymers may have a molecular weight distribution, i.e., a weight average molecular weight to number average molecular weight (Mw/Mn), of from about 2 to about 20, or from about 2 to about 12, for example, measured by gel permeation chromatography.

In addition, the propylene polymers may have a melt flow rate (MFR) measured by ASTM-D-1238-Condition L of from about 0.5 g/10 min to about 20.0 g/10 min or from about 0.5 g/10 min to about 15.0 g/10 min, or from about 0.5 g/10 min to about 5.0 g/10 min, for example. Alternatively, the MFR may be from about 5.0 g/10 min to about 15.0 g/10 min.

In addition, the heterophasic random copolymers may have a melt flow rate (MFR) measured by ASTM-D-1238-Condition L of from about 0.5 g/10 min to about 20 g/10 min or from about 0.5 g/10 min to about 15 g/10 min, or from about 0.15 g/10 min to about 5.0 g/10 min, for example.

The propylene polymers may further have a melting point of from about 158° C. to about 180° C. (under annealed conditions), or from about 163° C. to about 169° C. or from about 165° C. to about 168° C. for example, or at least about 160° C., measured by DSC.

The heterophasic random copolymers may further have a melting point of from about 158° C. to about 180° C., or from about 163° C. to about 169° C., or from about 165° C. to about 168° C. for example, or at least about 160° C., measured by DSC.

The propylene polymer may have a density, measured by ASTM D1505, of from about 0.89 g/cc, or from about 0.91 g/cc. The heterophasic random copolymers may have a density, measured by ASTM D1505, of from about 0.89 g/cc, or from about 0.91 g/cc.

The propylene polymers may further have a heat of fusion (or melt heat) of from about 40 cal/g to about 140 cal/g, or from about 60 cal/g to about 120 cal/g or from about 70 cal/g to about 100 cal/g for example, or at least about 90 cal/g measured by internal calorimetric measurements using ASTM D3417.

The propylene polymers may further have a xylene solubles at 25° C. of less than about 3.5%, or less than 3%, or less than 2% or less than 1% for example, measured using Flow Injection Polymer Analysis (FIPA), available from Viscotek. The propylene polymers may further have a xylene insoluble/heptane insoluble portion of the material of greater than 94%, or greater than 95%, or greater than 97%, for example, measured by NMR.

The propylene polymers may further have an mmmm pentad>98%, % meso>99%, or a defect frequency of less than 1 per 1000 carbon atoms, measured by NMR.

The propylene polymers may further have a degree of crystallinity between 0.4 to 0.85, or between 0.5 to 0.7 for example, measured by X-ray diffraction, density measurements, or calorimetric measurements.

Product Application

The polymers produced are useful in a variety of end-use applications, such as film production.

In one embodiment, the polymer is used to form a blown film. The blown film may be produced using any method known to those of ordinary skill in the art, such as a Davis Standard 5-layer mini coextrusion blown film line. In another embodiment, the polymer may be used to form a cast film, an oriented film, such as biaxially oriented polypropylene (BOPP), a double bubble film, a water quenched blown film, or an air quenched blown film.

Further, the process may include coextruding additional layers to form a multilayer film. The additional layers may be any coextrudable film known in the art, such as syndiotactic polypropylene, low density polyethylene, linear low density polyethylene, medium density polyethylene, high density polyethylene, ethylene-propylene copolymers, butylene-propylene compolymers, ethylene-butylene copolymers, ethylene-propylene-butylene terpolymers, ethylene-vinyl acetate copolymers, ethylene-vinyl alcohol copolymers, nylons, heterophasic random copolymer, etc.

The coextruded film, or coextrudate, has at least an outer layer and a core (or second) layer. The outer layer may comprise the polypropylene, while the core layer may comprise an impact copolymer. The core layer may comprise 15 wt % or less impact copolymer, or 10 wt % impact copolymer, or 5 wt % impact copolymer. The core layer comprising the impact copolymer may be blended with polyethylene or another polypropylene in any amount less than 15 wt % of impact copolymer based on the total amount of polymer in the core. The polypropylene may be a metallocene catalyzed polymer or a Ziegler-Natta catalyzed polymer.

The first layer of film may be 0.0625 mil. to 2.5 mil., or 0.125 mil. to 1.25 mil., or 0.25 mil. to 0.5 mil. in thickness. The optional second (or core) layer may be 0.125 mil. to 5 mil., or 0.25 mil. to 2.5 mil., or 0.5 mil. to 1.0 mil. in thickness. The total thickness of the film (whether a single or multilayer) may be 0.25 mil. to 10.0 mil., or 0.5 mil. to 5.0 mil., or 1.0 mil. to 2.0 mil. in thickness.

In order to modify or enhance certain properties of the films for specific end-uses, it is possible for one or more of the layers to contain appropriate additives in effective amounts. The additives may be employed either in the application phase (formation of blown film) or may be combined with the polymer during the processing phase (pellet extrusion), for example. Such additives may include stabilizers (e.g., hindered amines, benzofuranon, indolinone) to protect against UV degradation, thermal or oxidative degradation and/or actinic degradation, antistatic agents (e.g., medium to high molecular weight polyhydric alcohols and tertiary amines), anti-blocks, coefficient of friction modifiers, processing aids, colorants, clarifiers, nucleators, and other additives known to those skilled in the art.

In one embodiment, the polymer-based films are blown for use in, for example, heat resistant films, construction films, retort packaging, and laminated films or articles. Such films generally exhibit resistance to thermal cycles and impart mechanical properties such as toughness, impact resistance, puncture resistance, and tear resistance.

The film may have a tear resistance (machine direction), as determined by ASTM D1922, of from about 3 g to about 300 g or from about 6 g to about 150 g, or from about 9 g to about 25 g. The film may also have a tear resistance (transverse direction), as determined by ASTMD1922, of from about 100 g to about 1000 g, or from about 200 g to about 900 g, or from about 300 g to about 800 g.

The film may have a puncture resistance (machine direction), as determined by ASTM F1306-90 at 20 inches/minute, of from about 2 lbf to about 5 lbf.

The film may also have a 1% secant modulus (machine direction), as determined by ASTM D882, of from about 50 kpsi to about 500 kpsi, or from about 100 kpsi to about 300 kpsi, or from about 150 kpsi to about 250 kpsi. The film may also have a 1% secant modulus (transverse direction), as determined by ASTM D882, of from about 50 kpsi to about 500 kpsi, or from about 100 kpsi to about 300 kpsi, or from about 150 kpsi to about 250 kpsi.

The film has good heat resistance, wherein the film is exposed to temperatures of from 15° C. to 20° C. below the melting point up to the melting point of the polymer for 1 to 10 seconds or longer without significant physical or chemical changes.

EXAMPLES

Coextruded blown films were produced on a David Standard 5-layer mini coextrusion line. The extruders are grooved feed with 1 inch diameter screw and 24 L/D (screw length to screw diameter ratio). The line was characterized by having a conic spiral mandrel with a 60 mm diameter die and a 1.2 mm die gap. The films produced were 1.2 mils in thickness, 9.375 inch layflat (2.5 BUR (blow up ratio)), no neck height, with A/B/A structure having a layer distribution of 25%/50%/25%. The same throughput was used in every run for comparison purposes.

Table 1 presents the polypropylene grades used as the skin layers of the structures produced. Total Polypropylene 3270 (hereinafter referred to as 3270) is a high crystallinity, low soluble content propylene homopolymer with a melting point of 165° C. and vicat temperature of 158° C. Total Polypropylene 3271 and Total Polypropylene 3276 (hereinafter referred to as 3271 and 3276, respectively) are high soluble content propylene homopolymers and Total Polypropylene M3282MZ (hereinafter referred to as M3282MZ or M3282) is a clarified metallocene propylene homopolymer. Total HDPE 6410 (hereinafter referred to as 6410) is a narrow molecular weight homopolymer high density polyethylene. Total Polypropylene 4170 (hereinafter referred to as 4170), which was used as the core layer material in the film structures produced, is an impact copolymer having 0.75 melt flow rate and 163° C. melting point.

TABLE 1

Clarity polypropylene grades used as skin layer material.

| | RESIN | | | | |
| --- | --- | --- | --- | --- | --- |
| | 3270 PP | 3271 PP | 3276 PP | M3282MZ PP | 6410 HDPE |
| Target MFR | 2.0 | 1.5 | 2.0 | 2.2 | 1.2 |
| Melting Point | 165° C. | 163° C. | 163° C. | 153° C. | 135° C. |
| Vicat Temp | 158° C. | 150° C. | 151° C. | 141° C. | 130° C. |

Table 2 presents the film structures that were produced in this project.

TABLE 2

| A/B/A film structures produced for this project | |
| --- | --- |
| #1 | 3270/4170/3270 film |
| #2 | 3271/4170/3271 film |
| #3 | 3276/4170/3276 film |
| #4 | M3282MZ/4170/M3282MZ film |
| #5 | 6410/4170/6410 film |

Table 3 presents the melting peak and latent heat obtained by DSC for the film structures produced. Film structure #1 with 3270 has the highest melting point and absorbs the most energy as compared to the other polypropylene film structures. Structure #5 using 6410 HDPE absorbs a greater amount of heat, but it melts at a much lower temperature than polypropylene.

TABLE 3

$2^{nd}$ Melt peak and latent heat obtained by DSC for the film structures

| | Film Structure | 2nd Melt Peak ° C. | 2nd Melt Heat J/g |
| --- | --- | --- | --- |
| #1 | 3270/4170/3270 film | 164.9 | 88.4 |
| #2 | 3271/4170/3271 film | 161.4 | 75.6 |
| #3 | 3276/4170/3276 film | 160.7 | 77.2 |
| #4 | M3282MZ/4170/M3282MZ film | 162.2 | 72.5 |
| #5 | 6410/4170/6410 film | 134.7 | 118.8 |

FIG. 1 and Table 4 presents the MD and TD secant modulus (stiffness) data of the films. All of the structures are very well balanced (MD vs TD) in terms of stiffness, but there are important differences in stiffness among them: The film using 3270 as skin layers has the highest secant modulus followed by 3271 and 3276 while the film with M3282MZ in the skins produced a lower secant modulus and comparable in magnitude to the secant modulus that is obtained with 6410.

Figure 2:
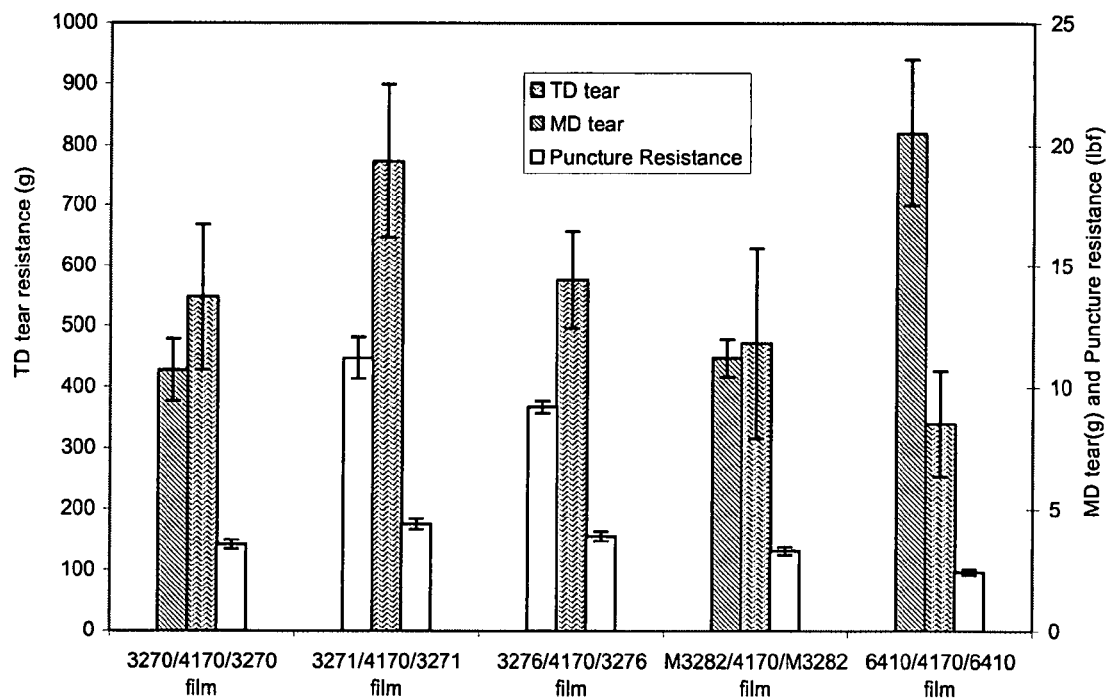
FIG. 2 illustrates the tear and puncture resistance of the films produced.

FIG. 2 and Table 5 presents the tear and puncture resistance obtained for the films. The polypropylene films have a better transverse direction tear as compared to the 6410 film structure. The puncture resistance of the films is relatively good considering the stiffness of the films.

TABLE 4

Secant modulus (stiffness) of the 1.2 mils films produced.

| | #1 (3270/ 4170/ 3270) | #2 (3271/ 4170/ 3271) | #3 (3276/ 4170/ 3276) | #4 (M3282/ 4170/ M3282) | #5 (6410/ 4170/ 6410) |
|---|---|---|---|---|---|
| 1% Secant Modulus MD (psi) | 216467 | 176737 | 172704 | 152753 | 154298 |
| 1% Secant Modulus TD (psi) | 189020 | 168649 | 162882 | 153001 | 156536 |

TABLE 5

Tear and puncture resistance of the 1.2 mils film produced.

| | #1 (3270/ 4170/ 3270) | #2 (3271/ 4170/ 3271) | #3 (3276/ 4170/ 3276) | #4 (M3282/ 4170/ M3282) | #5 (6410/ 4170/ 6410) |
|---|---|---|---|---|---|
| TD Tear (g) | 548 | 773.3 | 576.8 | 472.5 | 340.8 |
| MD Tear (g) | 10.7 | 11.2 | 9.2 | 11.2 | 20.5 |
| Puncture Resistance (lbf) | 3.54 | 4.39 | 3.89 | 3.3 | 2.43 |

A high crystallinity, low soluble content propylene homopolymer can be used as a skin layer of a coextruded blown film or as a monolayer film to produce a film with improved heat resistance for applications that involve thermal cycles. A heterophasic random copolymer can be used as the core layer to improve the tear and puncture resistance of the film.

While the foregoing is directed to embodiments of the present invention, other and further embodiments of the invention may be devised without departing from the basic scope thereof and the scope thereof is determined by the claims that follow.

What is claimed is:

1. A multi-layer heat resistant film comprising a first layer, said first layer consisting essentially of a polymer, the polymer comprising a high crystallinity propylene polymer having a melt flow rate of from 0.5 g/10 min. to 15 g/10 min., a xylene solubles of less than 3.5% and a second layer, said second layer comprising a heterophasic random copolymer, wherein the multi-layer film has a secant modulus in the transverse draw direction of from 150 kpsi to 250 kpsi.

2. The film of claim 1 wherein said propylene polymer has a melting point above 158° C.

3. The film of claim 1 wherein said heterophasic random copolymer is the core layer of said film.

4. The film of claim 1 wherein said heterophasic random copolymer has a melt flow rate of from 5 g/10 min. to 15 g/10 min. and a melting point of from 158° C. to about 180° C.

5. The film of claim 1 having a tear resistance in the transverse draw direction of greater than 500 grams.

6. The film of claim 1 having a tear resistance in the machine draw direction of greater than 10 grams.

7. The film of claim 1 having a puncture resistance of greater than 3.5 lbf.

8. The film of claim 1 having a secant modulus in the machine draw direction of greater than 200 kpsi.

9. The film of claim 1 having a heat of fusion above 90 cal/g.

10. The film of claim 1 having a degree of crystallinity between 0.5 to 0.85.

11. The film of claim 1 wherein said propylene polymer is isotactic.

12. The film of claim 1 wherein said film is blown, cast, or oriented.

13. An article of manufacture comprising the film of claim 1.

14. The article of manufacture of claim 13 wherein said article is a construction film, a retort package, or laminated article.

15. A process of producing a multi-layer heat resistant film comprising co-extruding a first polyolefin polymer having a melt flow rate of from 0.5 g/10 min. to 15 g/10 min. and a melting point of from 158° C. to 180° C. and a second polyolefin polymer have a melt flow rate of from 0.5 g/10 min. to 20 g/10 min., a melting point of from 158° C. to 180° C., wherein the multi-layer film has a secant modulus in the transverse draw direction of from 150 kpsi to 250 kpsi.

16. The film of claim 1, wherein second layer comprises 15 wt % or less impact copolymer.

17. The film of claim 1, wherein the high crystallinity propylene polymer is metallocene-based.

18. The film of claim 1, wherein the first layer is between 0.125 and 1.25 mil. in thickness.

19. The film of claim 18, wherein the second layer is between 0.25 and 2.5 mil. in thickness.

20. The film of claim 19, wherein the total thickness of the film is between 1 and 2 mil. in thickness.

* * * * *